United States Patent [19]

Jenkins

[11] 4,386,004

[45] May 31, 1983

[54] COMPOSITION FOR TREATING MASONRY MATERIALS

[76] Inventor: James L. Jenkins, 52 W. Ogden St., Montgomery, Ala. 36105

[21] Appl. No.: 279,818

[22] Filed: Jul. 2, 1981

[51] Int. Cl.³ ............................................. C11D 7/08
[52] U.S. Cl. ...................................... 252/145; 134/3; 252/79.4; 252/174.25; 252/551
[58] Field of Search ...................... 252/79.4, 142, 145, 252/174.25, 551; 134/3; 106/90

[56] References Cited

U.S. PATENT DOCUMENTS 3,997,460 12/1976 Sirine et al. ..................... 252/142 X

FOREIGN PATENT DOCUMENTS 49-44008 4/1974 Japan ................................. 252/142

*Primary Examiner*—Evan K. Lawrence
*Attorney, Agent, or Firm*—Woodford R. Thompson, Jr.

[57] ABSTRACT

A composition for treating masonry materials comprises a mixture of water, a light-duty liquid detergent composition, methyl salicylate, calcium chloride and muriatic acid. The composition is diluted with water for use as a cleaning solution. Also, the composition is diluted with water to provide a specific cleaning fluid which is mixed with an equal volume of a powdered pigment composition to form a protective coating for masonry materials.

1 Claim, No Drawings

COMPOSITION FOR TREATING MASONRY MATERIALS

BACKGROUND OF THE INVENTION

This invention relates to a composition for treating masonry materials and more particularly to a composition for cleaning masonry materials, such as removing excess mortar from bricks, stones, concrete blocks, clay tile and ceramic tile. My improved composition is also adapted for use as a protective coating for masonry materials and structures formed of masonry materials. While various compositions have been proposed for cleaning and protecting masonry materials, such compositions have not been entirely satisfactory due to the fact that some of these compositions do not clean the masonry materials readily and others are deleterious to the masonry materials due to the fact that they cause erosion of the surface of such materials. Also, such compositions heretofore employed do not provide any protective coating for protection of the masonry materials after they have been cleaned.

BRIEF SUMMARY OF THE INVENTION

In accordance with my invention, I provide a composition which is not only adapted for cleaning masonry materials but also provides a protective coating for the masonry materials after cleaning.

My improved composition comprises an aqueous mixture which consists of water, a light-duty detergent composition, methyl salicylate, calcium chloride and muriatic acid. Where my improved composition is used as a protective coating, I add thereto a powdered pigment composition comprising Portland cement, lime and titanium dioxide. Accordingly, it is an object of my invention to provide a composition for treating masonry materials which not only thoroughly cleans such materials but also provides a protective coating which is impervious to water and other fluids whereby my improved coating is weather-proof.

DETAILED DESCRIPTION

To form my improved composition, I add to 100 pounds of water (1,600 ounces) approximately 2 to 10 ounces of a light-duty detergent composition, approximately 4 ounces methyl salicylate (wintergreen oil), approximately 20 pounds calcium chloride (320 ounces), and approximately 80 pounds muriatic acid, approximately 20% strength (1,280 ounces). Accordingly, my composition for treating masonry materials comprises approximately the following parts by weight: 1,600 parts water, approximately 2 to 10 parts of a light-duty detergent composition, approximately 4 parts methyl salicylate (wintergreen oil), approximately 320 parts calcium chloride, and approximately 1,280 parts of 20% strength muriatic acid.

The light-duty detergent composition is of a conventional liquid type which consists of a mixture of surface-active compounds having exceptional sudsing and mildness characteristics. In actual practice, I find that such a liquid detergent composition which is satisfactory in every respect is disclosed in claim 1 of U.S. Pat. No. 3,793,233.

To use my improved composition set forth hereinabove for cleaning masonry materials, I mix approximately one part by volume of the above mixture with from one to ten parts by volume of water. The solution thus formed is preferably used to clean masonry products after all lumps and hard crusts have been removed therefrom by brushing with a wire brush or the like. In actual practice, I have found that my improved cleaning composition removes all mortar stains from the masonry materials and greatly improves the appearance of such cleaned masonry materials.

To form a protective coating from my improved composition for treating masonry materials, I mix approximately one part by volume of the above described mixture with two to five parts by volume of water to provide a specific cleaning fluid which I then mix with an equal volume of a powdered pigment composition which comprises approximately 70% to 95% by weight Portland cement, approximately 5% to 20% by weight lime and approximately 2% to 10% by weight titanium dioxide. That is, equal volumes of this specific cleaning fluid and the powdered pigment composition are mixed together. This powdered pigment composition should be mixed thoroughly and sifted prior to being mixed with the specific cleaning fluid described hereinabove. Upon adding the powdered pigment composition to the specific cleaning fluid, the composite mixture should be stirred well until all solids have dissolved to form a uniform liquid. This resulting liquid is particularly adapted for applying a protective coating to structures formed of brick, concrete blocks and structures having stucco applied thereto. In actual practice, I have found that the application of two or three coats of my improved protective coating is sufficient. However, the coats should be applied from 24 to 48 hours apart. The resulting coat thus applied to the masonry structure is weather-proof after drying. It will be understood that any dry powdered pigment color can be added to my protective coating composition prior to applying the composition by conventional means, such as by a brush or by spray means.

From the foregoing, it will be seen that I have devised an improved composition for treating masonry materials which is particularly adapted for cleaning the surfaces of structures formed of masonry materials and also is adapted to form a protective coating on such cleaned structures whereby the surface is weatherproof and neat in appearance.

I wish it to be understood that I do not desire to be limited to the precise examples, proportions or embodiments herein disclosed for obvious modifications will occur to a person skilled in the art.

What I claim is:

1. A composition for treating masonry materials comprising equal volumes of a specific cleaning fluid and a powdered pigment composition to provide a protective coating for application to masonry materials wherein said specific cleaning fluid comprises 2 to 5 parts by volume water and approximately 1 part by volume of a mixture of approximately the following parts by weight:
   (a) 1,600 parts water,
   (b) 2 to 10 parts of a light-duty liquid detergent composition consisting essentially of: from about 8% to about 35% of an alkyl ether sulfate obtained by sulfating and neutralizing the condensation product of from about 5 to about 12 moles of ethylene oxide and 1 mole of a high molecular weight primary alcohol having from about 10 to about 16 carbon atoms and having the formula $$R-(OC_2H_4)_r-OSO_3-M$$

wherein R is an alkyl having from about 10 to about 16 carbon atoms; M is a salt-forming cation; and r has an average value of from about 5 to about 12; an alkyl sulfate derived from a primary alcohol having the formula

ROSO$_3$—M wherein R is an alkyl having from about 10 to about 16 carbon atoms; and M is a salt-forming cation; the ratio of said alkyl ether sulfate to said alkyl sulfate being from about 2:1 to about 6:1, from about 2% to about 6% of an alkyl glyceryl ether sulfonate having a straight-chain alkyl of from about 12 to about 14 carbon atoms and wherein the cation of said sulfonate is an alkali metal, ammonium or alkylolamine; from about 2% to about 8% of a trialkylamine oxide having one straight-chain alkyl of from about 12 to about 14 carbon atoms and two short-chain alkyl groups of from 1 to about 2 carbon atoms; and the balance water, (c) 4 parts methyl salicylate,
(d) 320 parts calcium chloride, and
(e) 1,280 parts of 20% strength muriatic acid, and wherein said powered pigment composition comprises approximately 70% to 95% by weight Portland cement, approxmately 5% to 20% by weight lime and approximately 2% to 10% by weight titanium dioxide.

* * * * *